United States Patent

Chandross et al.

[11] Patent Number: 5,914,437
[45] Date of Patent: Jun. 22, 1999

[54] FABRICATION INCLUDING SOL-GEL FLOAT PROCESSING

[75] Inventors: Edwin Arthur Chandross, Murray Hill; David Wilfred Johnson, Jr., Bedminster; John Burnette MacChesney, Lebanon; Eliezer M. Rabinovich, Berkeley Heights; John Thomson, Jr., Spring Lake, all of N.J.

[73] Assignee: Lucent Technologies Incorporated, Murray Hill, N.J.

[21] Appl. No.: 08/880,319

[22] Filed: Jun. 23, 1997

Related U.S. Application Data

[63] Continuation of application No. 08/366,197, Dec. 29, 1994, abandoned.

[51] Int. Cl.[6] ......................................... C03B 8/00
[52] U.S. Cl. ............................................. 65/17.2; 65/182.1
[58] Field of Search ................................... 65/17.2, 182.1

[56] References Cited

U.S. PATENT DOCUMENTS

| | | | |
|---|---|---|---|
| 4,680,049 | 7/1987 | Onorato | 65/17.2 |
| 4,747,863 | 5/1988 | Clasen | 65/17.2 |
| 4,816,051 | 3/1989 | Clasen | 65/17.2 |
| 4,888,036 | 12/1989 | Clasen | 65/17.2 |
| 5,182,236 | 1/1993 | Caldwell | 65/17.2 |
| 5,240,488 | 8/1993 | Chandross et al. | 65/3.11 |
| 5,356,447 | 10/1994 | Bhandarkar | 65/395 |

OTHER PUBLICATIONS

Patent Abstracts of Japan, vol. 11, No. 80 (C–409), Oct. 1986, Nippon Sheet Glass Co. Ltd. *Note 1—Refs. AR, AS, AT, copies attached, are translations of portions of Jpanaese Patent JP–A–61 236 620. These translations are the only explicit basis for rejection under the EPC Office action.
WPI, Derwent, AN 86–316764.
CA, AN 106:106740 *Note 2—Other documents cited in the European Search Report—None set forth as sole basis for rejection are listed on a separate page attached hereto. Translations attached.
Kirk–Othmer "Encyclopedia of Chemical Technology" third ed, vol. 11, pp. 49–54, John Wiley, New York (1980).
C.J. Brinker and G.W. Scherer, *Sol–Gel Science* Acad. Press, Boston, pp. 2–18 (1990).

*Primary Examiner*—Timothy M. Speer
*Attorney, Agent, or Firm*—George S. Indig

[57] ABSTRACT

Cracking in thin sheets of sol-gel-produced material is avoided by use of a support liquid during gelation and drying. Silica glass, as well as other glass and ceramic bodies, is contemplated.

19 Claims, 2 Drawing Sheets

FABRICATION INCLUDING SOL-GEL FLOAT PROCESSING

This is a continuation of application Ser. No. 08/366,197, filed Dec. 29, 1994 now abandoned.

FIELD OF THE INVENTION

Sol-gel processing.

DESCRIPTION OF RELATED ART

A number of recent advances have increased interest in sol-gel processing. A recognized value is its capability for near-net shape, low temperature fabrication. Activity has concentrated on silica glass, which is generally superior to low-melting glasses for its optical and mechanical properties. The major processing problem is temperature—shaping generally requiring temperatures of 2200° C. and higher, in turn precluding most container materials. The allure of sol-gel is lowered temperature—initial low temperature treatment for producing the basic form (the "near-net shape"), followed by consolidation in free space at temperatures many hundreds of degrees lower than needed for conventional processing.

U.S. Pat. No. 5,240,488, issued Au. 31, 1993 has prompted considerable effort, directed to material choice and processing conditions, and toward better understanding of the process. Co-pending U.S. patent application Ser Nos. 08/221,114 and 08/221,204 both filed Mar. 31, 1994, are illustrative in prescribing conditions for strengthening the still-wet gel body, to expedite handling.

Sol-gel processing has already yielded low-cost, overcladding tubing, which together with inserted core rod, serves as a preform from which optical fiber is drawn. Potential value of the process in a variety of other silica glass products has not been overlooked. Compositional purity, freedom from defects, dimensional control, are among the many characteristics of the process that would be valuably applied in other fields and for other compositions. There is growing interest in production of a variety of products other than optical fiber.

SUMMARY OF THE INVENTION

A body of high-density, immiscible, liquid is used to support a gelled body during drying, thereby lessening strain due to contraction. In a preferred embodiment, it serves in lieu of a solid state mold, first for shaping and/or supporting the gelling body, and thereafter as a support during drying. A variety of gelled or gelling materials—ultimately to be crystalline or amorphous—are shaped and subsequently dried without contacting solid mold surfaces. Initial use will likely be in formation of sheet glass—of silica, or other composition or mixture. A somewhat modified process offers aperturing and shape variations within a still-flat product.

A fundamental value is supported, near-frictionless drying, and all variations provide for at least partial drying of a supported body, whether gelled on the support liquid or in a separate mold. For some purposes, the partially dried body, now shrunk to near-final size, is further dried on a solid support, or in a gaseous atmosphere, to uniformly expose major surfaces. Depending on purpose, the dried, porous body may be dehydroxylated or otherwise treated by gas exchange or volatilization, as now practiced in fiber fabrication. Supplemental grinding/polishing may be useful.

The inventive process may be adapted to the manufacture of intricate shapes. Initial forming in a conventional mold, to a completely or partially gelled state, may be followed by final gelling and/or drying on the support liquid.

DETAILED DESCRIPTION

General

Figure 1:
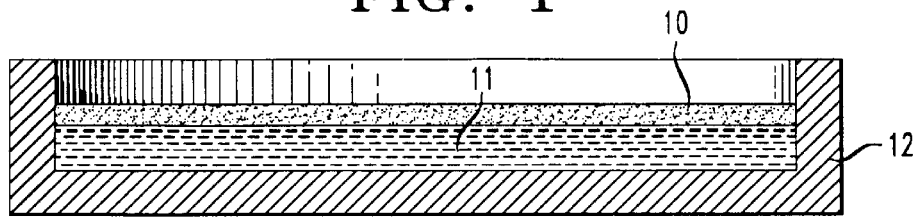
FIG. 1 is a front elevational view of apparatus holding a support liquid and a float sol-gel body undergoing processing.

The general concept is near-frictionless support of the gelling and/or drying body by use of a support liquid. Applied to thin sheet and to other fragile shapes, the procedure is an extension of the fundamental sol-gel concept. In attaining the fundamental objective of reduced temperature processing, the sol-gel process must cope with a very demanding problem. While the final consolidated (fired) body has all of the rigidity and strength of the same material produced by conventional melting, it may be quite fragile before consolidation. In the preparation of overcladding tubes for use in fiber preforms, the need has been met by gelling in a conventional mode, followed by careful removal and air-drying. That approach may not be satisfactory for product contemplated by the invention. Sheet material and other thin-wall shapes may not have sufficient structural integrity. In accordance with the invention, the body is supported by a supporting liquid during critical processing—at least during initial drying, and sometimes during gelling as well. Body thickness may be determined by free-flow conditions (simply by permitting it to spread without constraint) or alternatively, as constrained about its entire periphery by the container walls. Thickness uniformity—characteristically over ±5% over a major part of a broad dimension—is attainable. A surfactant to increase wettability facilitates production of thin sheets. Use of the invention in the manufacture of sheet a few centimeters or less in thickness is visualized.

Sheet material—thin or thick—may be shaped by molding, likely during at least later stages of gelling. A specific embodiment provides for shaping with an upper mold with protrusions which penetrate the gelling body through part or the entirety of its thickness. Preparation of less fragile, thicker shaped bodies, may use conventional molding, and depend on float-support to accommodate shrinkage during drying.

Known flotation processes may offer guidance. The relatively-high temperature plate-glass manufacturing process uses molten tin as the support liquid. Mercury has attributes of molten tin, and is useful for room temperature sol-gel processing. It has high density, is immiscible with the sol, is non-reactive and non-wetting. While suitable, it is expensive and poses possible toxicity problems.

Preferred embodiments depend on use of a different class of support liquids. Represented by the low molecular weight poly(chlorotrifluoroethylene)s, they are available with a suitable range of physical and chemical properties to meet most contemplated needs. Member compositions are non-toxic and affordable.

Within certain limits, plate material of excellent flatness and thickness uniformity may be produced by the unaided flotation process. Partial removal of sol by suction may reduce thickness. Final grinding or polishing may improve flatness.

Sheet product is expected to be commercially important. Consolidated silica glass will likely be a prevalent product. The consolidated sheet may have an aspect ratio of 10:1 or greater. It may have an area dimension of 10 cm or greater. The inventive process is useful in the preparation of thin-sheet material—of a material of a thickness of 2 cm or less.

Unconsolidated product—porous silica—may be used as a matrix, e.g. for photosensitive material in the manner of leached Vycor.

Many refinements developed for earlier processing are not discussed, but may be useful for certain aspects of float processing. For example, increasing temperature during drying may increase throughput without additional cracking. High optical quality may be assured by dehydroxylation (purification) and other practices used in the manufacture of optical fiber.

The Float Liquid

Primary requirements are considered for the more demanding embodiment in which at least initial gelling is carried out during flotation in which the supported body is a liquid.

Density—The density should be higher than that of the sol—generally at least 5% higher. Suitable support liquids are readily available—liquids used in the Examples had densities ranging from 1.6 g/cc to 1.9 g/cc, quite adequate for silica sol with its density of 1.3 g/cc.

Immiscibility—In general, liquid-liquid solubility is avoided. Where interaction between the support liquid and the sol is not intended, the requirement has been satisfied by operating-temperature (e.g. room-temperature) solubility of 0.01 g/cc or less. For water-based silica sols, the need is met by use of any of the support liquids in the Table.

Reactivity—Substantial chemical reactivity is usually prohibited, both for the fundamental purpose of flotation and to avoid contamination. The preferred class of organic compounds is essentially non-reactive for silica sol. In special instances, deliberate reactivity, perhaps due to minor amounts of added solute, is provided for modification of the float material.

Volatility—In the usual instance in which the final product is desirably free of support liquid, and where some wetting does occur, entrapped liquid may be removed by volatilization during drying or consolidation. The float liquid should be sufficiently volatile for the purpose. For increased-temperature processing, however, unwanted loss due to volatilization may be a factor. Increased capital cost for lower volatility, higher polymer-weight materials may be offset by reduced volatilization loss in use. Recovery by condensation may be cost effective.

Entrapped support liquid may be removed by solvent extraction in lieu of, or together with volatilization.

Friction—The inventive flotation processes offer essentially frictionless support of the float body while undergoing dimensional change. This is a fundamental attribute of any liquid-state material—any material of sufficiently low viscosity to take the shape of the float container.

Other Characteristics—Other characteristics to be considered include odor, toxicity and cost. Certain characteristics of the support liquid—reactivity, volatility, etc.—are inherent. The preferred halogenated organic compounds generally meet these criteria for use with aqueous sols. Additions may be made simply for cost-reduction through dilution or to tailor physical or chemical characteristics.

Preferred Category—Halogenated alkanes, alkenes, and arenes constitute a preferred class. Both cost and reactivity dictate choice of chloro- rather than bromo- or iodo- compounds. Tetrachloroethylene is readily available, appears to be of low toxicity, and is otherwise suited. Carbon tetrachloride, trichlorobenzene, bromobenzene, and iodobenzene, otherwise suitable, are illustrative of included compounds desirably avoided because of toxicity.

Low molecular weight polymers ("oligomers") of chlorotrifluoro ethylenes are commercially available, and are included in the preferred class of support liquids, e.g., for silica glass production. The first two members of one commercially-available series, have boiling points of 130° C. and 195° C. and densities of at least 1.70 g/cc at room temperature—adequate for a range of processing conditions used in the preparation of silica glass bodies. Property margins may permit cost-reduction by dilution with tetrachloroethylene.

Support liquids used in development of experimental results are listed in the Table.

TABLE

| Composition | Density(r.t.)g/cm$^3$ | Boiling Point, ° C. |
| --- | --- | --- |
| Mercury | 13.6 | 356.6 |
| Iodobenzene | 1.83 | 188.3 |
| Tetrachloro-ethylene | 1.62 | 121 |
| Polychlorotri-fluoro-ethylenes | 1.71 (37.8° C.) | 135 |
|  | 1.85 (37.8° C.) | 225 |
|  | 1.87 (37.8° C.) | 230 |

Values reported are for room temperature measurement, unless otherwise noted. The class of poly (chlorotrifluoroethylenes) is discussed in the Kirk Othmer "Encyclopedia of Chemical Technology" third ed., vol. 11, pp. 49–54, John Wiley, New York (980).

General Process

Flotation is suitably used with all forms of sol-gel processing. The emphasis has been on admixed ("colloidal" or "particulate") sols. Precipitate ("polymer", e.g. alkoxide) sol processes, depend on in-situ generation of particles by precipitation from solution. The inventive flotation process is applicable to either. Polymer processes are described in C. J. Brinker and G. W. Scherer, *Sol-Gel Science* Acad. Press, Boston, (1990) at pp. 2–18. The fundamental sol-gel process is unchanged by the use of flotation. With minor modifications, known and yet-to-be-developed processes benefit in the same way—flotation accommodates strain due to dimensional change and avoids cracking/warping.

The process of U.S. Pat. No. 5,240,488 represents the state-of-the-art, and may be adapted to the inventive use. An illustrative process based on that patent is set forth:

A 1 kg batch of aqueous silica sol—46 wt % loading with particles of 50 m$^2$/g surface area—is stabilized with 48 g tetramethylammonium hydroxide (TMAH). To the resulting pH 12 suspension, 10 g of 10% aqueous polyethyloxazoline and 5 g glycerin are added. The mixture is mixed for 5 minutes and is aged for 16 hours. Gelling agent—10 g methyl formate (MF)—is added and the sol is immediately poured on to the support liquid. Gelation typically requires 5–15 min.

Actual conditions used, while suitable for making the reported conclusions, were not optimized for commercial use. Polymer additive, central to the patented process, as well as glycerin, was omitted in the reported experimental work. The flotation process of this invention avoids cracking due to shrinkage-related strain. The patent process is, accordingly, of reduced consequence, but may be of some value.

Usual variants are permitted. Particle surface area, generally 20–200 m$^2$/g—a critical parameter for determining needed amount of polymer additive in U.S. Pat. No. 5,240,488—may be of less consequence as an independent criterion. Higher loading values within the generally-accepted range, 30–70 wt. % silica (usually in aqueous suspension), are generally desirable to minimize shrinkage. The pH range of 10–12 for the stabilized sol, used with usual TMAH-stabilization, is suitable for flotation processing. The value may vary for other stabilizers and may be empirically-determined as necessary for reliable charged-particle repulsion. Although not of consequence at this time, gelation may, in principle, proceed by increasing pH from an acidic stabilized sol.

Flotation

FIG. 1 is a schematic representation of a gelling layer 10 on a support liquid 11. The container 12, in this instance of low adhesion for layer 10 was of polyethylene. (In another example, polytetrafluoroethylene-coated metal was substituted.) For many purposes, the gel body should be of a high degree of flatness. A number of factors enter into the design. The free-space meniscus is one factor under any given circumstances, restricting the overall dimension of the float body to a decreasing center portion fraction of the meniscus increases flatness. The surface tension of the support liquid is the main determinant of the meniscus shape. The density and weight of the float-body is a contributing factor. This figure is representative of Example 4 in which a disk with ±5% deviation from flat, was produced by flotation within constraining container walls. The sol body did not wet the polyethylene container. The density of the polychlorotrifluoroethylene float liquid was 1.85 g/cc—a factor of approximately 1.42×that of the silica sol.)

Experimental conditions approximated those of a commercial process for making sheet glass of a thickness of from 1 to 2 cm and of a maximum linear dimension up to about 40 cm. Flatness reported was for the as-consolidated disk (before any grinding or polishing).

There are two distinct process embodiments for in-situ gelation—as distinguished from processes in which flotation serves primarily for drying of previously-gelled bodies. In the first, the periphery of the sol is constrained by the container, so that any area deviation is the result of shrinkage. The thickness is directly determined by the size of the container. If thickness is to be uniform, the flow rate of the sol must be sufficient to avoid substantial gelation during introduction. Circular and other small-aspect-ratio bodies may be in contact with the container about their entire periphery. This may not be the case for thin sheets of high-aspect ratio surface—for ratios of 10:1 or more.

In the second embodiment, the gelling body does not contact container walls. Thickness, likely smaller than in the first embodiment, depends on "free flow". Thickness of the unconstrained gelling body—of the near-equilibrium size and shape produced by the spreading of sol—is determined by a number of factors. Factors relating to the sol include: rate of introduction; viscosity; and rate of gelation. Wet gel thicknesses of 4.5 mm are readily attainable under free flow conditions otherwise in accordance with Example 7.

Interfacial forces determine equilibrium thickness. Spreading may be added mechanically; by use of excess sol followed by removal of the excess; or a surfactant layer may be formed before introduction of the sol.

A type of surfactant, used successfully with a polychlorotrifluoroethylene support liquid for increasing wetting, is described as:

An ethanol solution of an amphiphilic, essentially linear, straight chain compound, having a oleophilic substituent for wettability to the support liquid, and an ionizable head group (e.g. carboxyl or sulfonate) for wettability by the aqueous sol.

In one experiment, the surfactant was introduced and allowed to spread and cover the free surface, and thereafter permitted to stand while surfactant solvent (in this instance, ethanol) evaporated, leaving a microscopic thin surfactant layer on the surface of the support liquid. Its use permitted a sol flow-thickness of 0.4 mm. (Without surfactant, and under the same conditions, full surface coverage to fill the container required a thickness of 4.5 mm.)

Figure 2:
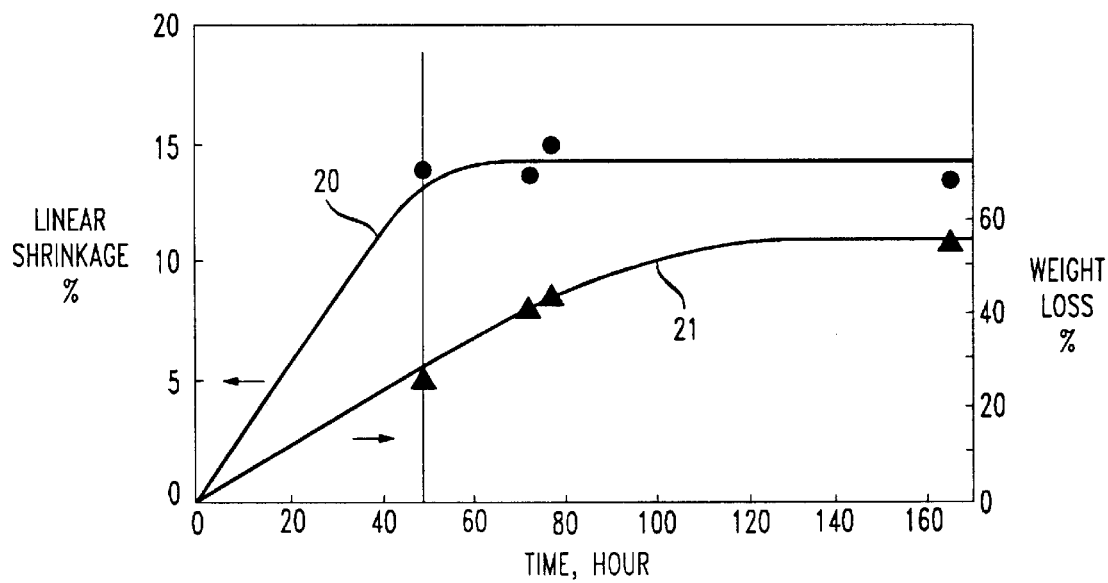
FIG. 2, on coordinates of time on the abscissa, and alternative ordinate units of linear shrinkage and weight loss, traces progress of a float body during gelation.

The data presented on FIG. 2 are usefully employed in a preferred embodiment. The support liquid, for thin and/or intricate forms, is valuable in permitting a near-frictionless interface during drying-shrinkage. Shrinkage generally terminates before complete drying. Comparison of curve 20 (shrinkage v. time) and curve 21 (weight loss v. time), shows cessation of shrinkage following 50% of final wt. loss. Beyond that point—under the conditions of the particular experiment of the figure, after about 50 hours—the drying body is dimensionally stable. The body may then be removed from the supporting liquid, and both major surfaces exposed to ambient for more rapid final drying.

Air movement has a significant effect on this "shrinkage time". An estimated air flow rate of 30 m/min. in a laboratory exhaust hood), reduced shrinkage time to less than 6 hours under conditions otherwise identical to those of FIG. 2.

The Example 4 conditions were used in development of the FIG. 2 data. Final disk dimensions were 5.0 mm thick and 12 cm diam. Completion of shrinkage ("shrinkage time")—the empirically-determined period required for 99% of drying-shrinkage—is a reliable criterion for permitted removal from the float support The Example 7 thinned sheet—reduced sufficiently to yield a final 1.4 mm thickness after firing by physical withdrawal of sol—had been sufficiently strengthened to permit free air-drying (without cracking) after this period.

Reference has been made to the hydrothermal treatment of co-pending U.S. patent application Ser. Nos. 08/221,114 and 08/221,204. Those claimed processes benefited by minimization of shrinkage during drying of the hydrothermally-strengthened gel body. This minimal shrinkage state—the "zero-shrinkage state", resulting from inclusion of a hydrothermal treatment step in the present invention may permit faster drying.

Most discussion has concerned formation of a simple sheet product. A variety of support liquids and processing conditions have established feasibility of high yield preparation of thickness 2–10 mm thick silica sheets of major dimension 20–60 cm and greater. Commercial practice will likely use now-familiar sols (20–200 m$^2$/gm surface area, 30–70 wt % loading in water, with minor additives including those to be removed on firing after having served their temporary purpose). Support liquids of density 1.5–1.87 g/cc were sufficient for flotation of the common 1.3 g/cc aqueous silica sol. The density range is not limiting.

Figure 3:
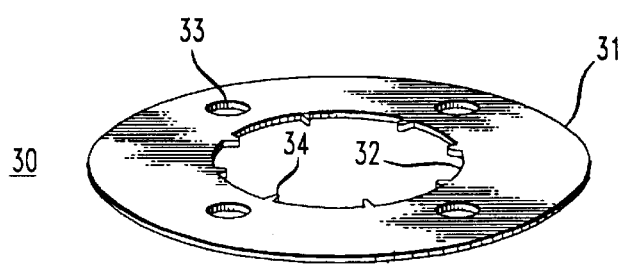
FIG. 3 is a planar view of a flat, shaped, gel body produced by an embodiment of the invention.

FIG. 3 shows a pierced and shaped silica support ring of a type used in semiconductor manufacture, prepared by the inventive process. The process and apparatus represented were used in production of a support ring. The final, consolidated ring 30 is annular, with outer periphery 31 of diameter 25.5 cm, and inner recess 32 of diameter 12.95 cm. The final body is 0.30 cm thick and has four equally-spaced 1.78 cm diameter holes 33. Positioning wedges 34, protrude a distance of 1.12 cm into the center recess.

Figure 4:
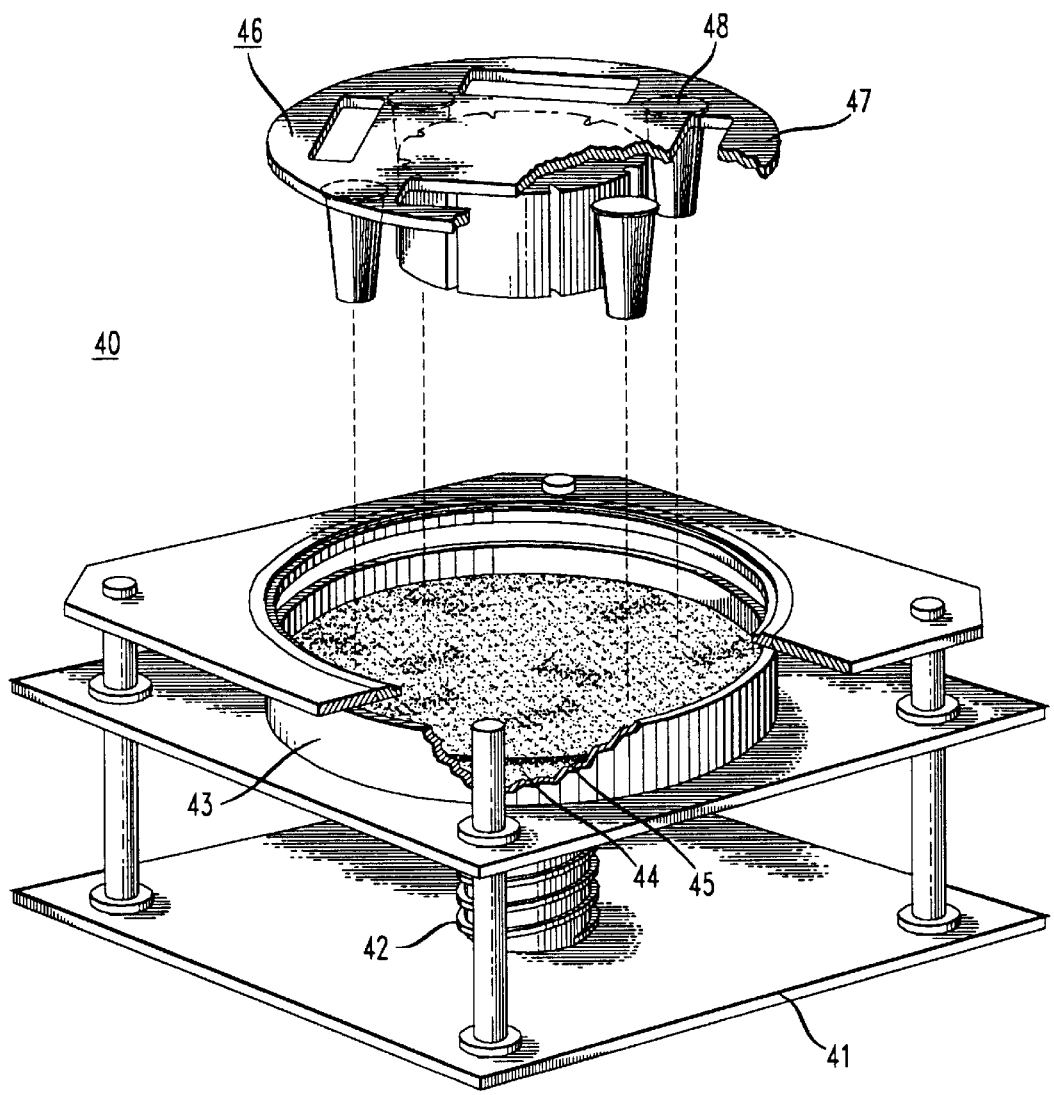
FIG. 4 is a perspective view of float equipment and mold, for producing a pierced, shaped gel body.

The apparatus 40 of FIG. 4 is shown during preparation of the ring of FIG. 3. It includes base 41, and jack 42 supporting container 43, containing support liquid 44 and sol layer 45. The upper mold 46 will be engaged as container 43 is raised. Mold 43 consists of polyethylene plate 47 provided with 4 tapered members 48. Members 48 are of polytetrafluoroethylene to minimize wetting. Immersed during gelation, they produce holes 33, shown in the FIG. 3 ring.

Figure 5:
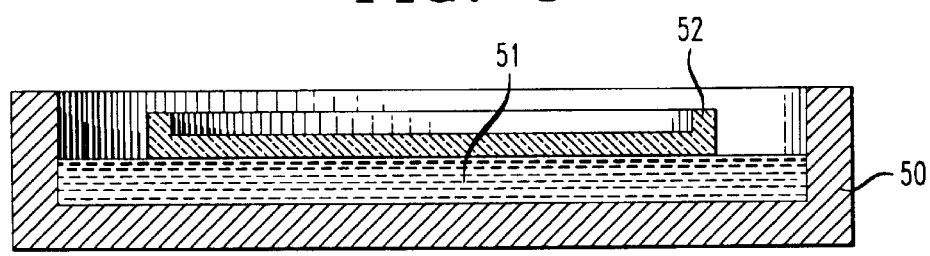
FIG. 5 is a perspective view of an embodiment in which a shaped body, produced in a conventional mold, has been transferred to a support liquid for initial drying.

FIG. 5 shows a container 50 with supporting liquid 51, supporting a dish-shaped gel body while drying. The body 52 is circular, with outside diam. of 25 cm and wall thickness of 0.5 cm, and had been prepared by conventional casting. Precautions Flatness—Slow initial drying, uniform airflow if used, and sintering while supported on a flat solid support, lessen warpage.

Voids—due to entrapment, either of ambient atmosphere or support liquid were avoided by introduction of the sol through a slit-shaped aperture close to the surface of the support liquid.

Thickness non-uniformity—was sometimes due to premature gelling (gelling during flow-introduction of the sol). Precautions include proper amounts of stabilizing and gelling agents, and cooling during flow (to $\geq 10°$ C. below room temperature).

The gelled body must be handled with care, particularly if removed during drying. In one series of experiments, a silica tray, submerged in the support liquid during gelation, was raised to support the body during removal.

EXAMPLES

Example 1

The apparatus of FIG. 1 was used in formation of a 0.5 cm thick silica sheet. The sol was prepared with ingredients and under conditions described in "General Process" but without added polymer or glycerin. A 2 cm deep layer of mercury, in a 27×18 cm glass container, was used to support 500 g of sol, and yielding a wet layer 0.8 cm thick. After gelation, the gel edges were cut free from the dish wall to allow contraction during drying. Drying was carried out under a laboratory hood in flowing air ar room temperature and 40% relative humidity.

After a shrinkage time of 5 hours, the disk was removed from the support liquid, was placed on a graphite support substrate, and drying was completed in ambient air.

The dried gel body was consolidated in two stages: 1) by heating in air to 800° C. from room temperature over a period of 10 hours, maintaining at that temperature ("soaking") for 2 hours and, while still at temperature, switching to a mixture of chlorine and helium for dehydroxylation; and 2) changing to He atmosphere, increasing temperature to 1400° C. over a 4-hour period, and by soaking at that temperature for one hour. The resulting glass body was of dimensions 17.3 cm×11.5 cm×0.5 cm thick.

Example 2

Gelation of a sol layer 2.5 cm thick and 28.7 cm diam. over a support liquid of iodobenzene was conducted in a polyethylene container. Shrinkage time, in air at ~40% rel. hum., was 24 hours. At this stage, disk dimensions were 24.9 cm diam. and 2.2 cm thick. Processing conditions of Example 1 yielded a consolidated disk of dimensions 18.4 cm diam. and 1.6 cm thick.

Examples 3–6

Example 2 was repeated, however, substituting the last 4 support liquids of the Table: tetrachloroethylene, and the three polychlorotrifluoroethylenes, in the order listed. Results were essentially indistinguishable.

Example 7

Example 2 was repeated, however using a glass container to assure edge adherence. The ungelled sol was reduced in thickness from 5.7 mm to 2.2 using suction. After a shrinkage period of about 24 hours, thickness was 1.9 mm. After separation from the container wall and final drying, the body was sintered to yield a consolidated thickness of 1.4 mm. Under the conditions of this Example, removal of greater amount of sol was unsuccessful and produced a discontinuous layer.

Example 8

The silica glass ring shown in FIG. 3 was prepared using the apparatus and conditions discussed in conjunction with FIG. 4. A sol of the composition of Example 1 was floated on the support liquid used in Example 4. The sol was cooled by about 5° C. to avoid premature gelation and was introduced through a 5 mm wide slit spaced ~1 cm from the support surface producing a continuous, bubble-free 5.7 mm thick sol layer. Container and contents were raised to engage the upper mold. After a 15-minute gelation period, the upper mold was disengaged.

Container and contents were covered to slow drying, and after a shrinkage time of two days, the body was transferred to a flat panel for final drying. The ring was then consolidated in a furnace at 1400° C. over a period of 60 min. The finished ring was transparent and had a diam of 25.5 cm.

Example 9

A ring of 25.5 cm diam. and 2.5 cm thickness with a U-shaped body cross-section was gelled in a lubricated graphite mold. After gelation, the casting was removed from the mold and placed on a stainless steel support plate. Plate and body were placed in a container filled with the support liquid of Example 4. The plate sank to the bottom, leaving the body floating. After a two-day shrinkage time, the steel plate was lifted, and together with the supported body, was placed in a controlled humidity chamber, (20° C., 60% relative humidity), in which final drying was carried out over a period of 1 day. Consolidation was by the two-stage process of Example 1, except that, taking account of the more delicate-shape, the 800° C. heating stage was continued for two days.

Example 10

The procedure of Example 8 was repeated, however, using a $\leq \mu m$ thick surfactant layer between the support liquid and the gelling body. The surfactant, belonging to the class potassium perfluoroalkylcarboxylates, increased wettability and permitted flow-introduction of a continuous sol layer of 2 mm thickness, which was then processed as in Example 8.
Subsequent Processing Reliance is had on the cited patent and other generally-known references for detailed processing conditions. For convenience, a brief outline of the consolidation method used in the examples is set forth.

Prefiring—Organic components, purposely added before gelation, together with inorganic and organic contaminants, are removed by "prefiring". Inorganic contaminants include $Na^+$, $K^+$, $Fe^{3+}$, $OH^-$. This prefiring is conducted in a closed silica muffle by first heating in air to 500° C., and holding at 500° C. generally for a period of 15–50 hours depending on dimensions. The atmosphere is then changed to a mixture of 15% $Cl_2$-85% He, and temperature is gradually raised to 800° C. over a period of several hours, and maintained for 2–3 hours.

For most purposes, prefiring need not be as rigorous as the gas treatment used in preparation of very demanding, optical fiber. If needed, the period of chlorine treatment may be extended for more complete dehydroxylation and it may be supplemented by other gas treatment, e.g. with $O_2$-free $SOCl_2$, in accordance with U.S. Pat No. 5,356,447, Oct. 18, 1994.

Final firing—The sheets, supported on a flat horizontal graphite surface were fired in vacuum or helium at 1350–1500° C. for a period of 1 hour, to result in a fully-transparent product.

Lower temperature firing—at 1300° C. and below—was found adequate where ultimate transparency was not required.

We claim:

1. Process for fabricating an article comprising, adding a gelling agent to a sol consisting primarily of admixed particles in an aqueous suspension medium to result in a wet gel body, drying the wet gel body so as to substantially remove the suspension medium, thereby producing a dried gel body, heating the dried gel body to produce a consolidated body, characterized in that drying, at least during an initial period, is conducted with the wet gel body supported by flotation on a support liquid, whereby strain due to contraction is reduced.

2. Process of claim 1 in which the support liquid comprises an organic compound, and in which the body is supported on the support liquid during substantially the entirety of the period of drying shrinkage.

3. Process of claim 2 in which the consolidated body is glass and consists essentially of silica.

4. Process of claim 2 in which the support liquid comprises a polymer of a halogen-containing organic compound.

5. Process of claim 1 in which the body is removed from the support liquid upon completion of drying shrinkage, after which further drying is conducted.

6. Process of claim 5 in which the body is suspended during further drying so that substantially all surface is uniformly dried.

7. Process of claim 5 in which the body is supported by a solid surface during further drying.

8. Process of claim 1 in which a substantial part of gelation is conducted with the body supported by the support liquid.

9. Process of claim 8 in which processing conditions during introduction of the sol permit shaping prior to significant gelation, whereby a sheet of uniform thickness is produced.

10. Process of claim 9 wherein the sheet has an aspect ratio of at least 10:1 and a length dimension of at least 10 cm.

11. Process of claim 10, wherein the thickness of the sheet is of a uniformity of at least ±5% over a substantial part of a broad dimension of the sheet.

12. Process of claim 9 in which the body is shaped by means of inserted mold members during gelation.

13. Process of claim 8 in which a substantial portion of the periphery of the body contacts the container during gelation.

14. Process of claim 13 in which the thickness of the body is reduced by partial removal of sol prior to complete gelation.

15. Process of claim 8 in which a substantial portion of the periphery of the body is out of contact with the container during gelation.

16. Process of claim 1 in which wettability of the support liquid by the sol is increased by a surfactant.

17. Process of claim 16 in which the surfactant is miscible with the support liquid.

18. Process of claim 1 in which gelation is substantially completed prior to introduction onto the support liquid.

19. Process of claim 1 in which the interface between the body and the support liquid is modified by a surfactant layer.

* * * * *